United States Patent [19]

Teece

[11] Patent Number: 5,361,100
[45] Date of Patent: Nov. 1, 1994

[54] APPARATUS AND METHOD FOR TRANSFORMING A VIDEO IMAGE INTO A THREE DIMENSIONAL VIDEO IMAGE WITH SHADOWS

[75] Inventor: Howard J. Teece, Basingstoke, United Kingdom

[73] Assignee: Sony United Kingdom Limited, Staines, United Kingdom

[21] Appl. No.: 42,770

[22] Filed: Apr. 6, 1993

[30] Foreign Application Priority Data

Apr. 24, 1992 [GB] United Kingdom ............... 9208929

[51] Int. Cl.$^5$ .................. H04N 5/262; G06F 15/62; G06F 15/72
[52] U.S. Cl. .................... 348/578; 348/44; 345/139; 395/125; 395/126
[58] Field of Search .............. 358/22, 160, 183, 185; 395/127, 126, 119, 129, 132, 125; 345/139; 382/41, 54; 348/578, 576, 577, 584, 590, 593, 571, 722, 844, 25, 28, 42, 44; H04N 5/262, 5/222; G06F 15/62, 15/72

[56] References Cited

U.S. PATENT DOCUMENTS

| | | | |
|---|---|---|---|
| 4,525,858 | 6/1985 | Cline et al. ........................... | 382/1 |
| 4,791,581 | 12/1988 | Ohba ................................... | 395/125 |
| 4,835,712 | 5/1989 | Drebin et al. ....................... | 364/518 |
| 4,943,938 | 7/1990 | Aoshima et al. ..................... | 345/139 |
| 4,965,844 | 10/1990 | Oka et al. ............................. | 382/44 |
| 5,043,922 | 8/1991 | Matsumoto ........................... | 395/126 |
| 5,103,217 | 4/1992 | Cawley ................................. | 395/129 |

FOREIGN PATENT DOCUMENTS

| | | | |
|---|---|---|---|
| 0248626 | 12/1987 | European Pat. Off. ..... | G06F 15/72 |
| 2254751 | 10/1992 | United Kingdom ......... | G06F 15/72 |
| 2256109 | 11/1992 | United Kingdom ......... | G06F 15/62 |

*Primary Examiner*—Mark R. Powell
*Assistant Examiner*—Safet Metjahic
*Attorney, Agent, or Firm*—William S. Frommer; Alvin Sinderbrand

[57] ABSTRACT

There is described a video special effects apparatus 1 comprising: transforming means 2, 10, 12, 14 for mapping an input video image (FIG. 3A) onto a three-dimensional surface (FIG. 3B) to form a transformed image; luminance level calculating means 16 for calculating luminance levels $I_{out}$ for parts of said transformed image to produce an effect of a positive light source P generating positive light that increases luminance levels of parts of said transformed image corresponding to parts of said three-dimensional surface where said positive light is incident and a negative light source N generating negative light that decreases luminance levels of parts of said transformed image corresponding to parts of said three-dimensional surface where said negative light is incident; and luminance level control means 6 for controlling luminance levels of parts of said transformed image in dependence upon said calculated luminance levels.

10 Claims, 3 Drawing Sheets

APPARATUS AND METHOD FOR TRANSFORMING A VIDEO IMAGE INTO A THREE DIMENSIONAL VIDEO IMAGE WITH SHADOWS

BACKGROUND OF THE INVENTION

Field of the Invention

This invention relates to video special effects apparatus and methods.

Description Of the Prior Art

U.S. Pat. No. 4,791,581 and United Kingdom Published Patent Application GB-A-2,254,751 describe examples of video special effects apparatus which transforms two-dimensional video images into pseudo three-dimensional video images in three-dimensional co-ordinate space.

In such conventional video special effects apparatus, one or more imaginary light sources can be used to generate an illusion of depth. However, such conventional video special effects apparatus has the disadvantage that it may generate inappropriate brighter portions in particular three-dimensional video images.

An example of such a situation is illustrated in FIG. 1 of the accompanying drawings. An imaginary light P is shone on to areas A and B of a free-form solid S. Since both area A and area B are facing the imaginary light P in a similar manner, the image intensity for both area A and area B is increased. However, in the real world, a shadow would be cast on area B by hump C. Thus, the increase in the image intensity For area B gives an unnatural appearance to the transformed image.

It is an object of the present invention to provide more realistic images in which such problems are reduced.

SUMMARY OF THE INVENTION

The invention provides a video special effects apparatus comprising:
(i) transforming means for mapping an input video image onto a three-dimensional surface to Form a transformed image;
(ii) luminance level calculating means for calculating luminance levels For parts of said transformed image to produce an effect of a negative light source generating negative light that decreases luminance levels of parts of said transformed image corresponding to parts of said three-dimensional surface where said negative light is incident; and
(iii) luminance level control means for controlling luminance levels of parts of said transformed image in dependence upon said calculated luminance levels.

The use of negative light enables shadows to be introduced into a transformed image to create more realistic results, e.g. in FIG. 1 a shadow for hump C can be introduced.

In preferred embodiments of the invention said luminance level calculating means is operable to calculate luminance levels for parts of said transformed image to produce an effect of a positive light source generating positive light that increases luminance levels of parts of said transformed image corresponding to parts of said three-dimensional surface where said positive light is incident.

The use of both positive and negative light enables both highlights and shadows to be introduced so as to produce particularly natural looking transformed images.

In preferred embodiments of the invention said luminance level calculating means produces said effect such that, for a point on said three-dimensional surface, said negative light decreases luminance by an amount substantially inversely proportional to distance from said negative lights source to said point.

This preferred feature enhances the realism of the effect by diminishing the decrease in luminance level as the distance between the negative light source and the point in question increases. The same preferred feature also applies to the positive light source.

Another feature of preferred embodiments of the invention is that said luminance level calculating means produces said effect such that, for a point on said three-dimensional surface, said negative light decreases luminance by an amount substantially proportional to a scalar product of a unit vector normal to said three-dimensional surface at said point and a unit vector of said negative light at said point.

This preferred feature enhances the realism of the effect by taking account of the angle of incidence of the negative light when determining by how much it darkens the luminance level. Once again the same preferred feature also applies for the positive light source.

It is important that the calculation of luminance level should be performed as efficiently as possible. To this end, in preferred embodiments of the invention said luminance level calculating means calculates luminance level, for a point on said three-dimensional surface, using a relationship, $$I_{out} = \frac{K_d * I_{pin} * (N \cdot L_p)}{D_p + d0} + \frac{K_d * I_{nin} * (N \cdot L_n)}{D_p + d0}$$

where $I_{out}$ is said luminance level, $K_d$ is a coefficient of reflection at said point, $I_{pin}$ is a positive light source intensity, $I_{nin}$ is a negative light source intensity, N is a normal vector to said three-dimensional surface at said point, $L_p$ is a unit vector of said positive light at said point, $L_n$ is a unit vector of said negative light at said point, $D_p$ is a distance from said positive light source to said point, $D_n$ is a distance to said negative light source to said point, and $d_O$ is a constant to allow for non-division by zero.

The invention also provides a video special effects method comprising the steps of:
(i) calculating luminance levels for parts of a transformed image, to be formed by mapping an input video image onto a three-dimensional surface, to produce an effect of a negative light source generating negative light that decreases luminance levels of parts of said transformed image corresponding to parts of said three-dimensional surface where said negative light is incident;
(ii) mapping said input video image onto said three-dimensional surface to form said transformed image; and
(iii) controlling luminance levels of parts of said transformed image in dependence upon said calculated luminance levels.

The above, and other objects, features and advantages of this invention will be apparent from the Following detailed description of illustrative embodiments which is to be read in connection with the accompanying drawings.

DESCRIPTION OF THE PREFERRED EMBODIMENTS

Figure 1:
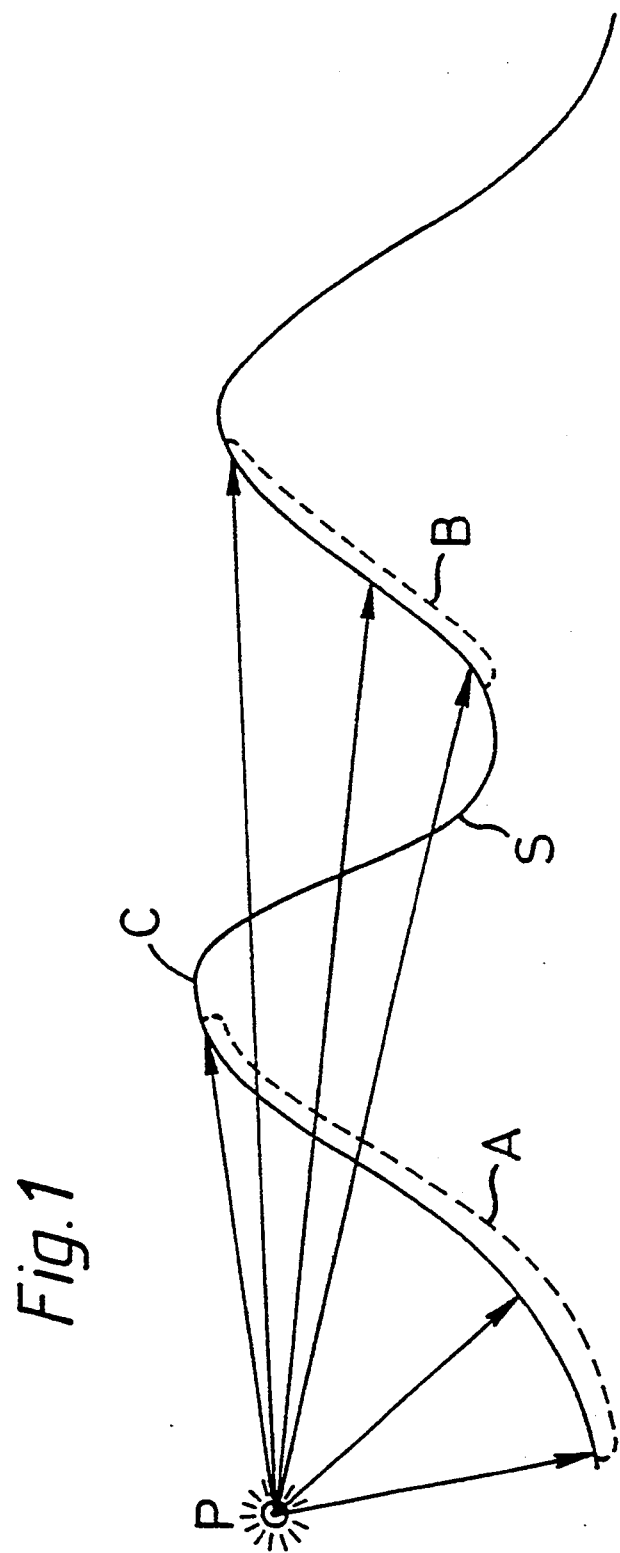
FIG. 1 is a schematic diagram for illustrating use of a positive light source in a video special effects apparatus.
Figure 2:
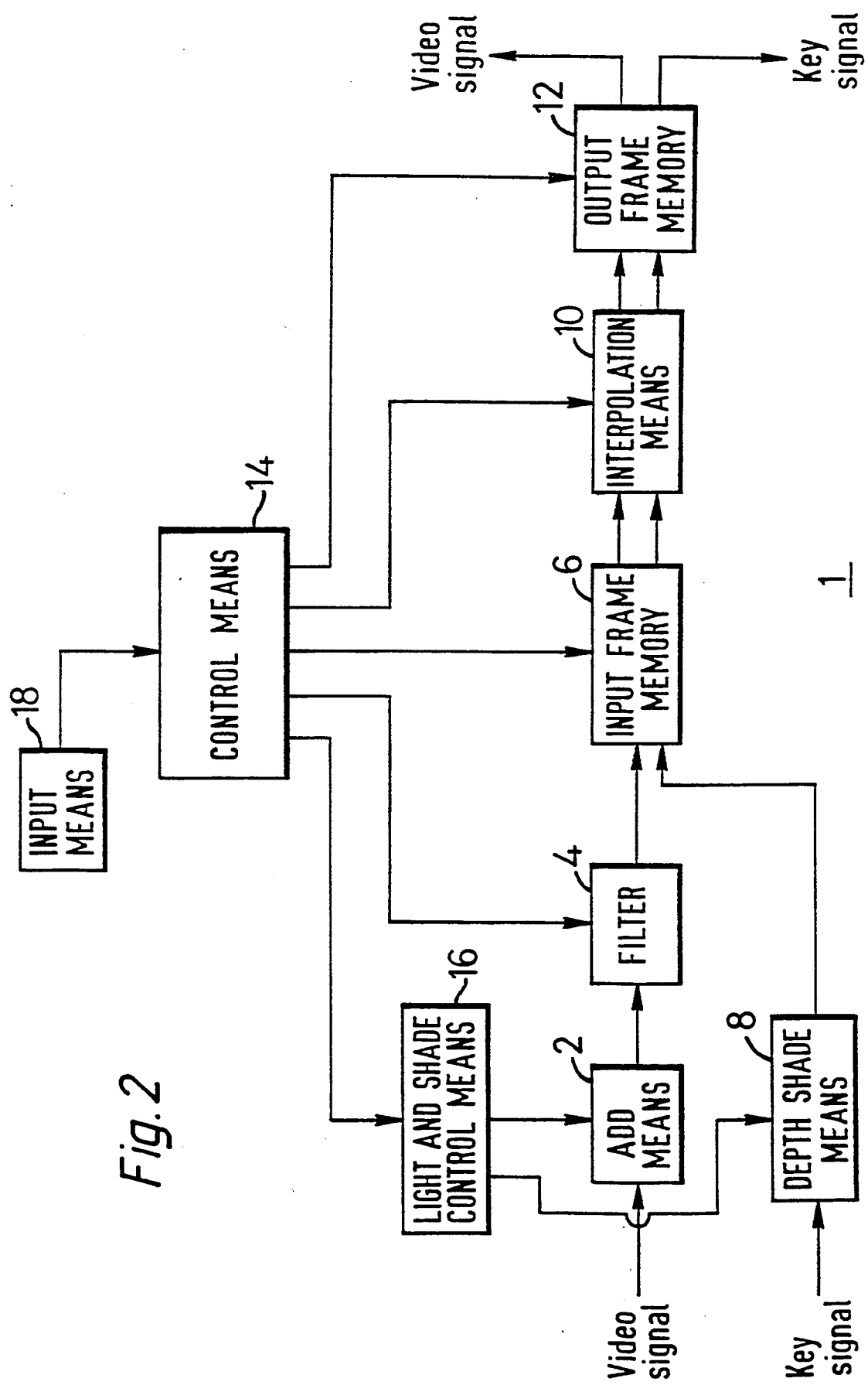
FIG. 2 is a block diagram of one embodiment of a video special effects apparatus according to the invention.

Referring to FIG. 2, the structure of a video special effects apparatus 1 will be described. Input video image signals are input to an add means 2. Output video signals from the add means 2 are supplied to a filter means 4. Output video signals from filter means 4 are supplied to an input frame memory 6. Input key signals are supplied to a depth shade means 8. Output key signals from the depth shade means are also supplied to the input Frame memory 6. Output video signals and key signals from the input frame memory 6 are supplied to an interpolation means 10. Output video signals and output key signals from the interpolation means 10 are supplied to an output frame memory 12.

A control means 14 supplies: transformation information signals and imaginary light position signals to a light and shade control means 16; filter control signal to the filter means; read/write control signals to the input frame memory 6 and the output frame memory 12; and interpolation control signals to the interpolation memos 10. The light and shade control means 16 also supplies luminance level control signals and depth shade control signals to the add means 2 and the depth shade means 8 respectively. Input means 18 supplies user defined instruction signals to the control means 14.

Figure 3B:
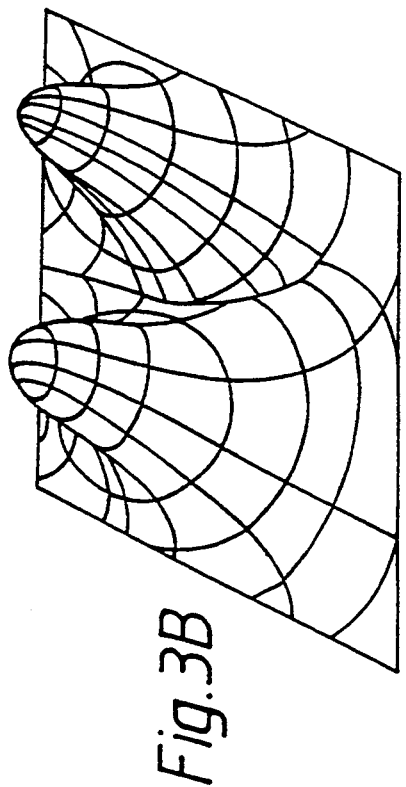
FIGS. 3A and 3B are schematic diagrams illustrating a transforming operation that may be performed by the video special effects apparatus shown in FIG. 2.
Figure 3A:
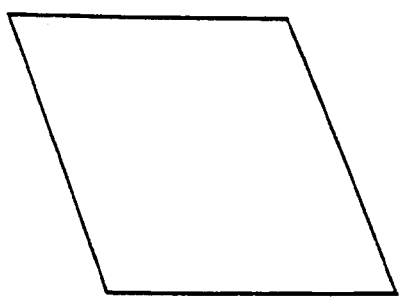

Next referring to FIG. 2, FIG. 3A and FIG. 3B, a transformation operation of the video special effect apparatus 1 will be described. A video image signal, as shown in FIG. 3A, which may, For example, be reproduced by a VTR, is input to the input frame memory 6 through the add means 2 and the filter means 4, and stored at appropriate pixel locations in the input frame memory 6 in dependence upon write address control signals from the control means 14.

User input instruction signals, which designate transformation information, imaginary positive light position and imaginary negative light position, are input via input means 18. The input means 18 supplies these instruction signals to the control means 14. The control means 14 generates read/write control signals for the input frame memory 6 and the output frame memory 12 and interpolation control signal for the interpolation means 10 according to transformation information signals specifying the mapping and supplies these control signals to the input frame memory 6, output frame memory 12 and interpolation means 10 respectively. The input video image is transformed by the combined action of the input frame memory 6, the interpolation means 10 and the output frame memory 12 to effect the coordinate transformation and mapping as shown in FIG. 3B. Transforming an input video image on to a three-dimensional surface is described in U.S. Pat. No. 4,791,581.

Figure 4:
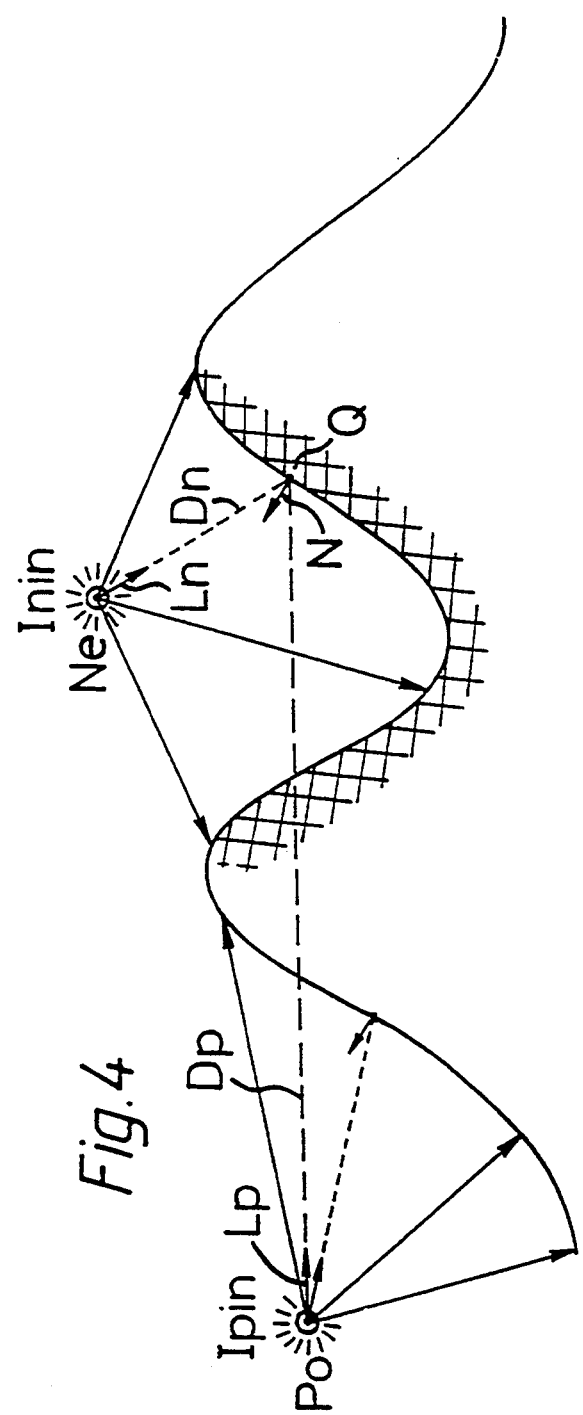
FIG. 4 is a schematic diagram illustrating the calculation of luminance level that may be performed by the video special effect apparatus shown in FIG. 2.

Next with reference to FIG. 4, the light and shade control means 16 calculates luminance level at all of points Q on the three-dimensional surface (free-form solid) according to the transformation information and position signals representing positions of a positive light source P and a negative light source N supplied from the control means 14 by using the following relationship:

$$I_{out} = \frac{K_d * I_{pin} * (N \cdot L_p)}{D_n + d0} + \frac{K_d * I_{nin} * (N \cdot L_n)}{D_p + d0}$$

where $I_{out}$ is said luminance level, $K_d$ is a coefficient of reflection at said point, $I_{pin}$ is a positive light source intensity, $I_{nin}$ is a negative light source intensity, N is a normal vector to said three-dimensional surface at said point, $L_p$ is a unit vector of said positive light at said point, $L_n$ is a unit vector of said negative light at said point, $D_p$ is a distance from said positive light source to said point, $D_n$ is a distance to said negative light source to said point, and $d_O$ is a constant to allow for non-division by zero.

In the equation, (N.L) represents the scalar vector product (inner product) of the vectors N and L. The final output intensities $I_{out}$ are calculated over all of the three-dimensional surface. The add means 2 controls luminance level of input video signal according to the calculated intensities $I_{out}$ calculated by the light and shade control means 16. The light and shade control means 16 also calculates depth shade values data according to depth information supplied from the control means 14. The depth shade means controls the level of the input key signal so that the key signal also has depth information which represents a depth effect. The luminance level controlled video signals from the add means 2 are supplied to the filter means. The filter means 4 filters output video signals from the add means 2 with filter coefficient controlled by the control means 14 so that the alias components are reduced. Then the output video signals from the filter means are supplied to the input frame memory to be transformed.

The interpolation means 10 generates video data and key data for each pixel of the output frame memory 12 from the video data and key data output from the input frame memory 6 using an interpolation routine controlled by an interpolation control signal from the control means 14. The output video signals and the key signals from the interpolation means 10 are supplied to the output frame memory 12 and stored in the output frame memory 12 according to the write control signal from the control means 14. Video data and key data are read out from the output frame memory 12 under the control of the control means 14 and are subsequently supplied to another signal processing means or a monitor (not shown).

According to the above described preferred embodiment of the invention, it is possible to cast a realistic shadow on the transformed image. The add means 6 can be inserted at a point behind the interpolation means 10 or output frame memory 12 instead of the point shown in FIG. 2, although the position shown in FIG. 2 is preferred as it reduces the processing requirements needed to cope with controlling pixel values near discontinuities in the transformed image.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for transforming a video image into a three dimensional video image with shadows, comprising:
   means for receiving said video image;
   means for mapping the video image onto a three-dimensional surface to form a transformed image;
   means for calculating positive luminance levels at points of the transformed image having incident thereon a positive light from an imaginary positive light source;
   means for calculating negative luminance levels at points of the transformed image having incident thereon a negative light from an imaginary negative light source; and
   means for controlling final luminance levels at all points of the transformed image in accordance with luminance levels at the respective points as determined by said video image increased by values of said positive luminance levels at the respective points and reduced by values of said negative luminance levels at the respective points.

2. The apparatus as claimed in claim 1, wherein said positive luminance levels at said respective points of the transformed image are substantially inversely proportional to distances from said positive light source to said respective points.

3. The apparatus as claimed in claim 1, wherein said negative luminance levels at said respective points of the transformed image are substantially inversely proportional to distances from said negative light source to said respective points.

4. The apparatus as claimed in claim 1, wherein each of said positive luminance levels at said respective points is substantially proportional to a scalar product of a unit vector normal to the three-dimensional surface at said respective point and a unit vector of said positive light at said respective point.

5. The apparatus as claimed in claim 1, wherein each of said negative luminance levels at said respective points is substantially proportional to a scalar product of a unit vector normal to the three-dimensional surface at said respective point and a unit vector of said negative light at said respective point.

6. The apparatus as claimed in claim 1, wherein said means for controlling controls the final luminance level at a point of the transformed image, using a relationship, $$I_{out} = \frac{K_d * I_{pin} * (N \cdot L_p)}{D_p + d0} + \frac{K_d * I_{nin} * (N \cdot L_n)}{D_n + d0}$$

where $I_{out}$ is said final luminance level,
   $K_d$ is a coefficient of reflection at said point,
   $I_{pin}$ is an intensity of said imaginary positive light source,
   $I_{nin}$ is an intensity of said imaginary negative light source,
   N is a normal vector to said three-dimensional surface at said point,
   $L_p$ is a unit vector of said positive light at said point,
   $L_n$ is a unit vector of said negative light at said point,
   $D_p$ is a distance from said imaginary positive light source to said point,
   $D_n$ is a distance to said imaginary negative light source to said point, and d0 is a constant to provide for non-division by zero.

7. The apparatus as claimed in claim 1, wherein said means for mapping includes:
   input memory means for storing said video image,
   interpolation means for interpolating each pixel of said video image in accordance with transformation information to produce interpolated data,
   output memory means for storing said interpolated data, and supplying said interpolated data as an output, and
   control means for generating said transformation information, and for controlling read addresses of said input memory means and write addresses of said output memory means in accordance with said transformation information.

8. The apparatus as claimed in claim 7, further comprising means for receiving said transformation information and supplying said transformation information to said control means.

9. The apparatus as claimed in claim 1, further comprising means for receiving position data representing positions relative to said three-dimensional surface of said imaginary positive light source and said imaginary negative light source.

10. Method of transforming a video image into a three dimensional video image with shadows, comprising the steps of:
   receiving said video image;
   mapping the video image onto a three-dimensional surface to form a transformed image;
   calculating positive luminance levels at points of the transformed image having incident thereon a positive light from an imaginary positive light source;
   calculating negative luminance levels at points of the transformed image having incident thereon a negative light from an imaginary negative light source; and
   controlling final luminance levels at all points of the transformed image in accordance with luminance levels at the respective points as determined by said video image increased by values of said positive luminance levels at the respective points and reduced by values of said negative luminance levels at the respective points.

* * * * *